United States Patent [19]

Lenz

[11] 4,011,994
[45] Mar. 15, 1977

[54] TRANSPORTABLE GROUND SPRAYING DEVICE

[76] Inventor: Richard R. Lenz, 15 Michel Drive, Henrietta, N.Y. 14467

[22] Filed: Sept. 18, 1975

[21] Appl. No.: 614,477

[52] U.S. Cl. ............................. 239/287; 239/168; 239/175
[51] Int. Cl.² ......................................... B05B 1/20
[58] Field of Search .......... 239/167, 168, 286, 287, 239/176, 175

[56] References Cited

UNITED STATES PATENTS

| | | | |
|---|---|---|---|
| 2,305,913 | 12/1942 | Troyer | 239/168 |
| 3,231,198 | 1/1966 | Ackley et al. | 239/168 |
| 3,412,938 | 11/1968 | Larson | 239/168 X |
| 3,423,027 | 1/1969 | Small et al. | 239/287 |
| 3,565,341 | 2/1971 | Burroughs | 239/168 |
| 3,726,481 | 4/1973 | Foster et al. | 239/287 |
| 3,877,643 | 4/1975 | Smith et al. | 239/287 |

*Primary Examiner*—Johnny D. Cherry
*Assistant Examiner*—Michael Mar
*Attorney, Agent, or Firm*—Fred L. Denson

[57] ABSTRACT

A novel sprayer for treating ground surfaces with liquid materials is described. The sprayer is readily transportable, collapsible, easily adjustable and non-corrosive and has a collapsible frame which includes an adjustable handle section, a dependent leg section and a guide between the handle section and the leg section. A pair of wheels are rotatably mounted on the leg sections and are inwardly collapsible to facilitate transportability of the sprayer. An elongated support member having an upper portion and a lower portion is secured to the collapsible frame by the guide. Attached to the lower portion of the elongated support member is an adjustable platform having a lower crossbar member and an upper crossbar member. Two bolts are adjustably connected to the two crossbar members in a manner such the distance therebetween can be adjusted by rotating the bolts. Attached to the upper crossbar member of the adjustable platform is a boom support. A knuckle coupling is attached to each end of the boom support and a boom is connected to each knuckle coupling. Attached to each boom is a spray nozzle to which spray material is delivered by a flexible non-corrosive hose. Either boom can be moved in a plane substantially parallel or perpendicular to the ground surface to facilitate spraying in relatively inaccessible areas. Both booms can be raised for transportation or storage purposes. The height of the spray nozzles above the surface are readily adjustable by adjusting the distance between the crossbar members and the use of a flexible, non-corrosive hose attached directly to the spray heads minimizes undesirable corrosive effects of the spray material.

7 Claims, 6 Drawing Figures

TRANSPORTABLE GROUND SPRAYING DEVICE

BACKGROUND OF THE INVENTION

This invention relates to a novel transporable ground sprayer.

Several types of ground sprayers are used for spraying liquid materials to treat ground surfaces having various characteristics. Many of the sprayers have booms containing spray nozzles for spraying the liquid materials. While these types of ground sprayers provide a relatively efficient means for treating surfaces, there are certain disadvantages associated with their use. The operator of the sprayer is frequently required to overlap areas which have already been sprayed in order to treat relatively inaccessible areas such as those which are immediately adjacent to trees, shrubbery, buildings or other structural objects. Even where there is no obstacle present but the surface to be treated is immediately adjacent to a surface which is not to be treated, liquid is wasted either by overlap or by having to spray the surface which is not to be treated in order to adequately spray the desired surface. Because of the dimensions of the boom, conventional sprayers are somewhat bulky and thus not readily transportable. Also, the liquid to be sprayed is delivered from a reservior to the spray nozzles by metal tubing. The liquids used frequently cause the metal tubing to corrode which leads to inefficient applications.

OBJECTS

It is therefore an object of this invention to provide a novel ground sprayer.

It is a further object of this invention to provide a ground sprayer which is conveniently transportable.

Another object of this invention is to provide a ground sprayer which economically and efficiently utilizes spray materials.

A further object of this invention is to provide a ground sprayer which can spray in relatively inaccessible areas without wasting spray materials.

Yet another object of the invention is to provide a ground sprayer which sprays materials without causing internal corrosion to the sprayer.

Another object of the invention is to provide a ground sprayer wherein the spray pattern is conveniently controlled.

SUMMARY OF THE INVENTION

These and other objects of the invention are accomplished with a transportable ground sprayer which is collapsible, easily adjustable and non-corrosive. The novel sprayer of this invention has a collapsible frame which includes an adjustable handle section, a dependent leg section and a guide between the handle section and the leg section. A pair of wheels are rotatably mounted on the leg sections and are inwardly collapsible to facilitate transportability of the sprayer. An elongated support member having an upper portion and a lower portion is secured to the collapsible frame by the guide. Attached to the lower portion of the elongated support member is an adjustable platform having a lower crossbar member and an upper crossbar member. Two bolts are adjustably connected to the two crossbar members in a manner such that the distance therebetween can be adjusted by rotating the bolts. Attached to the upper crossbar member of the adjustable platform is a boom support. A pivotably mounted hinge is attached to each end of the boom support and a boom is connected to each hinge. Attached to each boom is a spray nozzle to which spray material is delivered by a flexible non-corrosive hose. Either boom can be moved in a plane substantially parallel or perpendicular to the ground surface to facilitate spraying in relatively inaccessible areas. Both booms can be raised for transportation or storage purposes. The height of the spray nozzles above the surface are readily adjustable by adjusting the distance between the crossbar members and the use of a flexible, non-corrosive hose attached directly to the spray heads minimizes undesirable corrosive effects of the spray material.

DESCRIPTION OF THE PREFERRED EMBODIMENT

Figure 1:
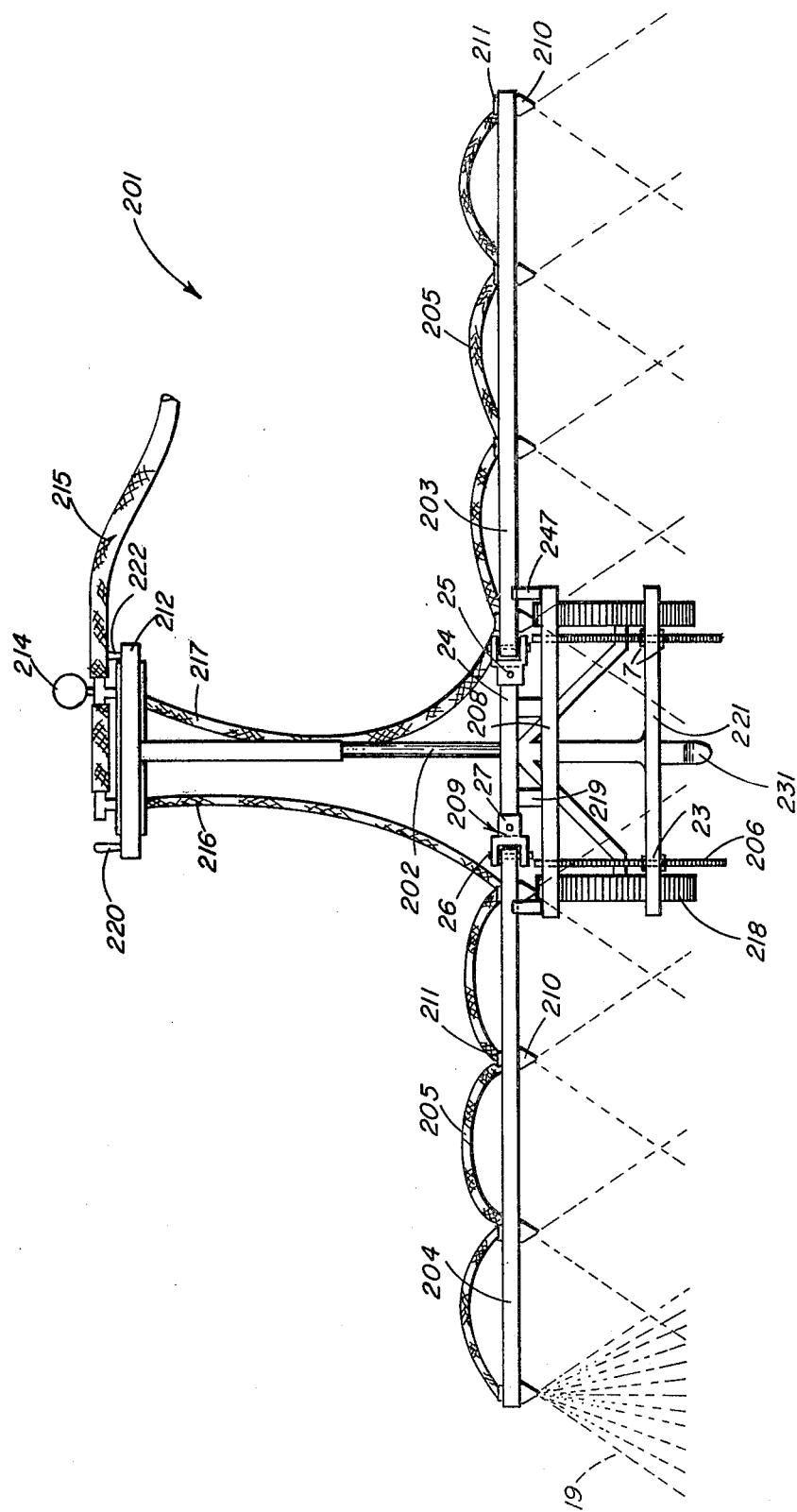
FIG. 1 is a front elevation of the transportable sprayer of this invention.
Figure 2:
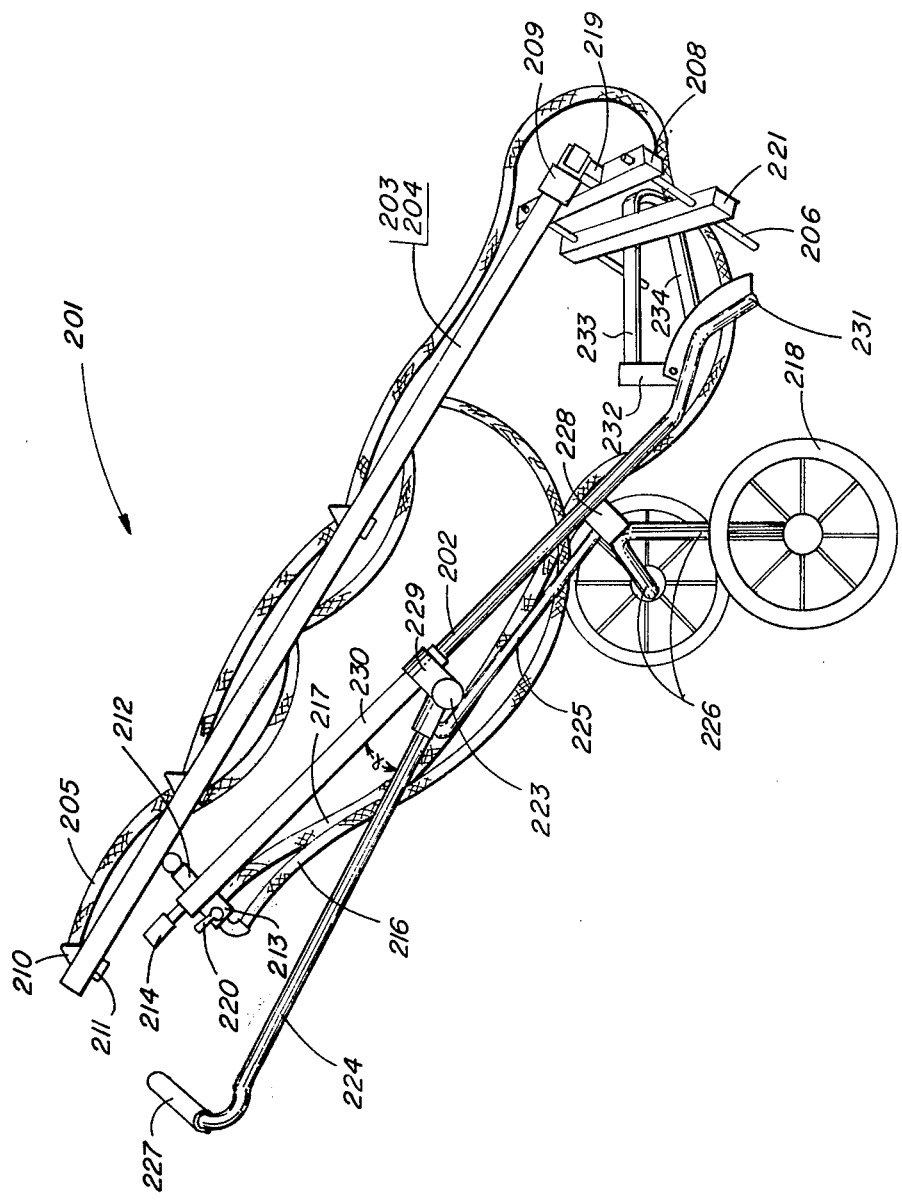
FIG. 2 is a perspective view of the transportable sprayer of this invention.
Figure 3:
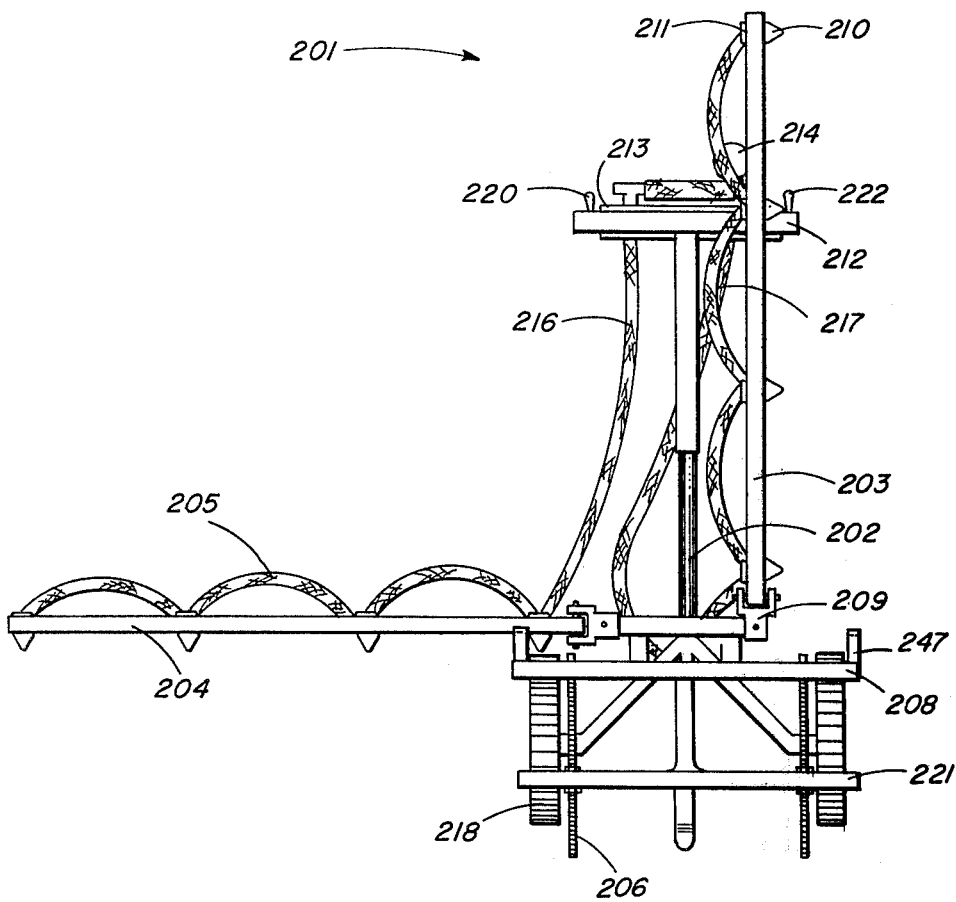
FIG. 3 is a front elevation of the transportable sprayer of this invention having one boom in a vertically elevated position.

As shown in FIGS. 1, 2 and 3 ground sprayer 201 contains a handle having upper portion 224 and grip 227. Lower portion 225 is attached to legs 226 by connecting member 228. Wheels 218 are rotatably attached to legs 226 by any known suitable means. The remaining end of legs 226 are pivotally attached to connecting member 228 to permit their inward movement to render the sprayer more suitable for transporting it from one location to another. Guide 229 and adjustable set screw 223 are situated between the upper portion 224 and lower portion 225 of the handle.

An elongated support member contains upper portion 230 and lower portion 202. The two portions are connected in a telescopic manner thus rendering the length of the elongated support member adjustable. Attached to the upper portion 230 of the elongated support member is boom rest 212 against which booms 203 and 204 rest when in the elevated position as explained below. Guide 229 is situated between upper portion 230 and lower portion 202 and assists in maintaining the allignment of the handle and the elongated support member. The angle α between the elongated support member and the handle is adjustable by loosening set screw 223 and rotating the handle either upward or downward to suit the height of the operator and then retightening set screw 223. Attached to lower portion 202 is support leg 231 which enables the sprayer to stand freely and independently in a relatively vertical position when it is not in use.

An adjustable platform having an upper crossbar member 208, lower crossbar member 221 and thread bearing members 206 is attached to lower portion 202 of the elongated support member by connecting members 232, 233 and 234. As shown in FIG. 1, both upper crossbar member 208 and lower crossbar member 221 contain suitable holes 23 to permit the passage therethrough of threaded members 206. The distance between the two crossbar members is adjustable by rotating threaded members 206 and/or locking nuts 7 (FIG. 1).

Figure 5:
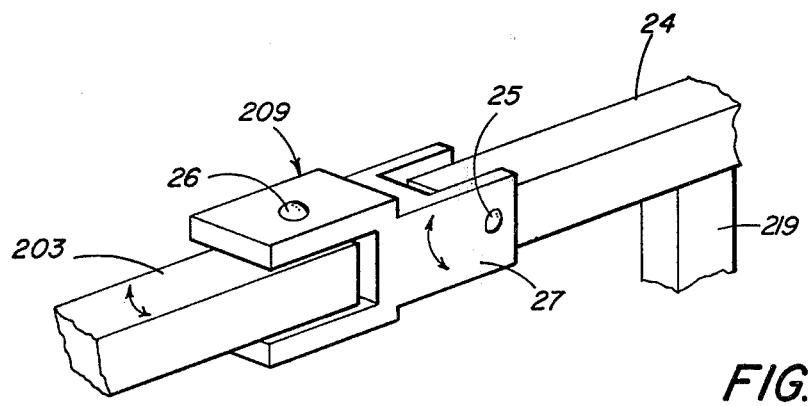
FIG. 5 is a perspective view of a knuckle coupling used in conjunction with the boom.

As shown in FIG. 1, boom support 24 is affixed to the top of upper crossbar member 208 by connectors 219. Knuckle coupling 209 has sleeve portion 27 into which the end of boom support 24 is inserted as depicted in FIG. 5. A connecting member such as knuckle coupling 209 is pivotably attached to the end of boom support 24 by pivot pin 25. The knuckle coupling and the boom support are provided with complementary openings of the appropriate size to accommodate pin 25. This connection permits rotation of boom 203 in a plane which is substantially vertical to the ground, as shown in FIG. 3. Boom 203 and 204 are pivotably attached to knuckle coupling 209 by pivot pin 26 (FIG. 5). The receiving end of coupling 209 and the end of boom 203 are provided with suitable openings to accommodate pin 26. This connection permits the free rotation of boom 203 and boom 204 in a plane substantially parallel to the ground as shown in FIG. 2 and FIG. 3. Support brackets 247 are attached to upper crossbar member 208 and support booms 203 and 204 when they are in the lowered position.

Spray nozzles 210 are spaced at suitable intervals along booms 203 and 204 and are fixedly attached thereto. The material to be sprayed is supplied from a reservoir (not shown) to the sprayer by hose 215. A fluid divider such as header 213 divides the incoming material into two (2) parts, one part being supplied to hose 216 and nozzles 210 and the remaining part being supplied to hose 217 and nozzles 210. The flow of fluid in each of lines 216 and 217 is controlled by valves 220 and 222 respectively. The pressure of the incoming fluid is monitored by pressure gauge 214. Connecting hoses 205 deliver fluid to inlets 211 of spray nozzles 210 thus avoiding contact of the liquid with the metal portions of the sprayer.

The height of nozzles 210 above the surface to be sprayed is adjusted by rotating threaded members 206 which causes vertical movement of the upper crossbar member 208, boom support 24, boom 203 and 204 and spray nozzles 210. The height to which the nozzles are adjusted is dependent upon several factors well known to those skilled in the art including the spray pattern 19 desired, the velocity of movement of the sprayer over the surface, the fluid being applied, the characteristics of the ground surface, etc. Supply hose 215 is readily detachable by a quick disconnect coupling or other suitable means to permit its attachment to other fluid spraying means such as a hand held wand.

Figure 4:
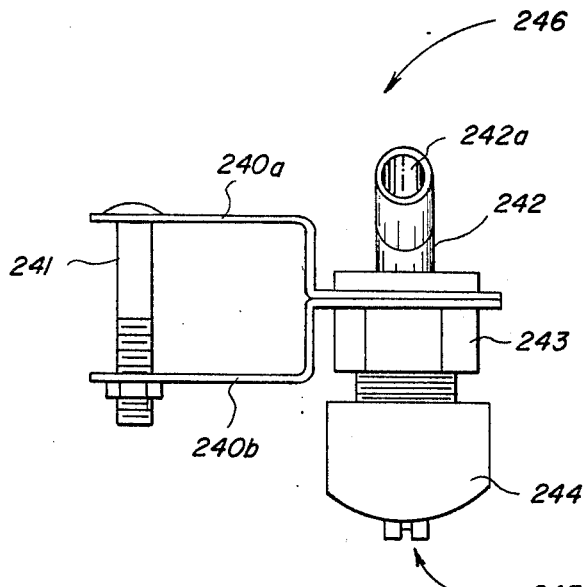
FIG. 4 is a side elevation of a spray nozzle used on the boom of the transportable sprayer of this invention.
Figure 4A:
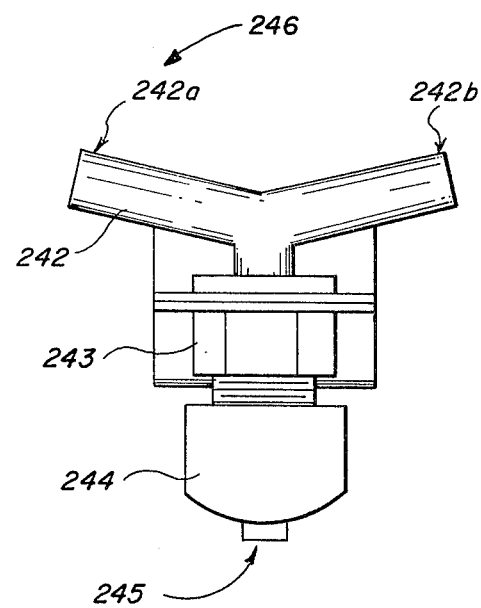
FIG. 4A is a front elevation of a srpay nozzle used on the boom of the transportable sprayer of this invention.

Nozzles 210 can be of any design and constructed of any of a number of non-corrosive materials such as nylon. They may be replaced with other nozzles which produce either a courser or finer spray. One suitable nozzle is Tee Jet Type 112 as described in U.S. Pat. No. 2,618,511. As shown in FIG. 4, nozzle assembly 246 has inlet hose connection 242a and outlet hose connection 242b. Nut 243 holds nozzle 244 to support bracket 240a and 240b. Nozzle 244 contains slotted opening 245 through which liquid is sprayed. Support brackets 240a and 240b are attached to either boom 203 or 204 by bolt 241 and hold the entire nozzle assembly in place.

The sprayer can be used with both booms fully extended or with one fully extended and the other in a raised position as shown in FIG. 3. When one boom is raised, it is frequently desirable to shut off the valve associated with the hose attached to the raised boom. Use of the sprayer of this invention enables the operator to separately control the fluid supplied to the spray nozzles associated with each boom on an individual basis. Also, where it is necessary to spray close to buildings or other places where the surface being treated is discontinued, the edge can be effectively treated without wasting fluid and without overlapping portions which have already been sprayed. Corrosion by the spray material being dispensed is not a problem with the sprayer of this invention since the material is transported to the spray nozzles entirely by a flexible hose constructed of a non-corrosive material such as teflon or other synthetic polymeric material. As shown in FIG. 2, the device is collapsible into a relatively small transportable package and can be easily conveyed from one location very conveniently. Wheel sections 226 are inwardly collapsible so that wheels 218 may be brought inward to further facilitate transportation between usage.

The sprayer of this invention can be constructed of any suitable material but lightweight, relatively non-corrosive materials are preferred. Booms 203 and 204 are typically made from ¾ inch square hollow aluminum tubing and can be of any width although widths ranging from 8 to 12 feet for the total width of both spray booms have been found suitable.

The invention has been described in detail with particular reference to preferred embodiments thereof, but it will be understood that variations and modifications can be effected within the spirit and scope of the invention.

I claim:

1. A transportable and collapsible ground sprayer comprising:
   a. a collapsible frame having an adjustable handle section, a depending leg section and a guide situated therebetween;
   b. a pair of inwardly collapsible wheels rotatably attached to the leg section;
   c. an elongated support member secured to the frame by said guide, said elongated support member having an upper portion and a lower portion;
   d. an adjustable platform attached to the lower portion of the elongated support member said platform having a lower crossbar member, an upper crossbar member and at least two thread bearing members fixedly attached to the upper crossbar member and adjustably connected to the lower crossbar member in a manner such that the distance therebetween can be adjusted by rotating the thread bearing members;
   e. a boom support fixedly attached to the upper crossbar member of the adjustable platform;
   f. connecting members attached to each end of the boom support;
   g. a boom pivotably and hingedly affixed to each end of the boom support by said connecting members wherein each boom is transversely rotatable in a plane parallel to the ground surface and vertically rotatable in a plane substantially perpendicular to the ground surface;
   h. nozzles attached to the booms;
   i. a flexible, non-corrosive hose having an inlet attached to the upper portion of the elongated support member and an outlet bearing a fluid conducting relationship to the spray nozzle.

2. The transportable ground sprayer of claim 1 having a valve in fluid conducting relationship with the hose inlet to control the flow of a fluid transported by the hose to the spray nozzles.

3. The transportable ground sprayer of claim 1 having separate hoses attached to the spray nozzles on each boom.

4. The transportable ground sprayer of claim 3 having a valve in fluid conducting relationship for each hose inlet to individually control the pressure of a fluid transported by each hose.

5. The transportable ground sprayer of claim 1 including a pressure gauge situated near the hose inlet.

6. The transportable ground sprayer of claim 1 including a support leg attached to the lower portion of the elongated support member.

7. The transportable ground sprayer of claim 1 wherein the adjustable handle section is rotatable.

* * * * *